Figure 1:
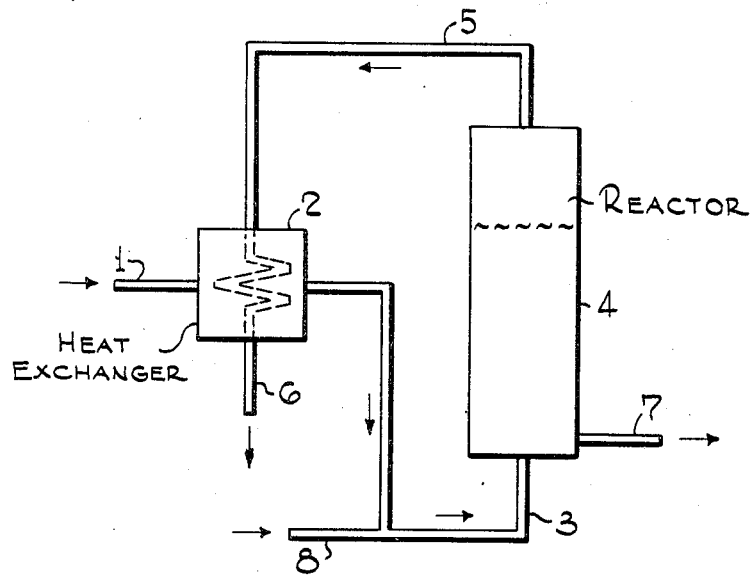

Dec. 21, 1954  S. B. SWEETSER ET AL  2,697,733
POLYMERIZATION PROCESS
Filed May 18, 1951  3 Sheets-Sheet 1

Sumner B. Sweetser, Inventors
Donald D. McLaren
By P. K. Young, Attorney

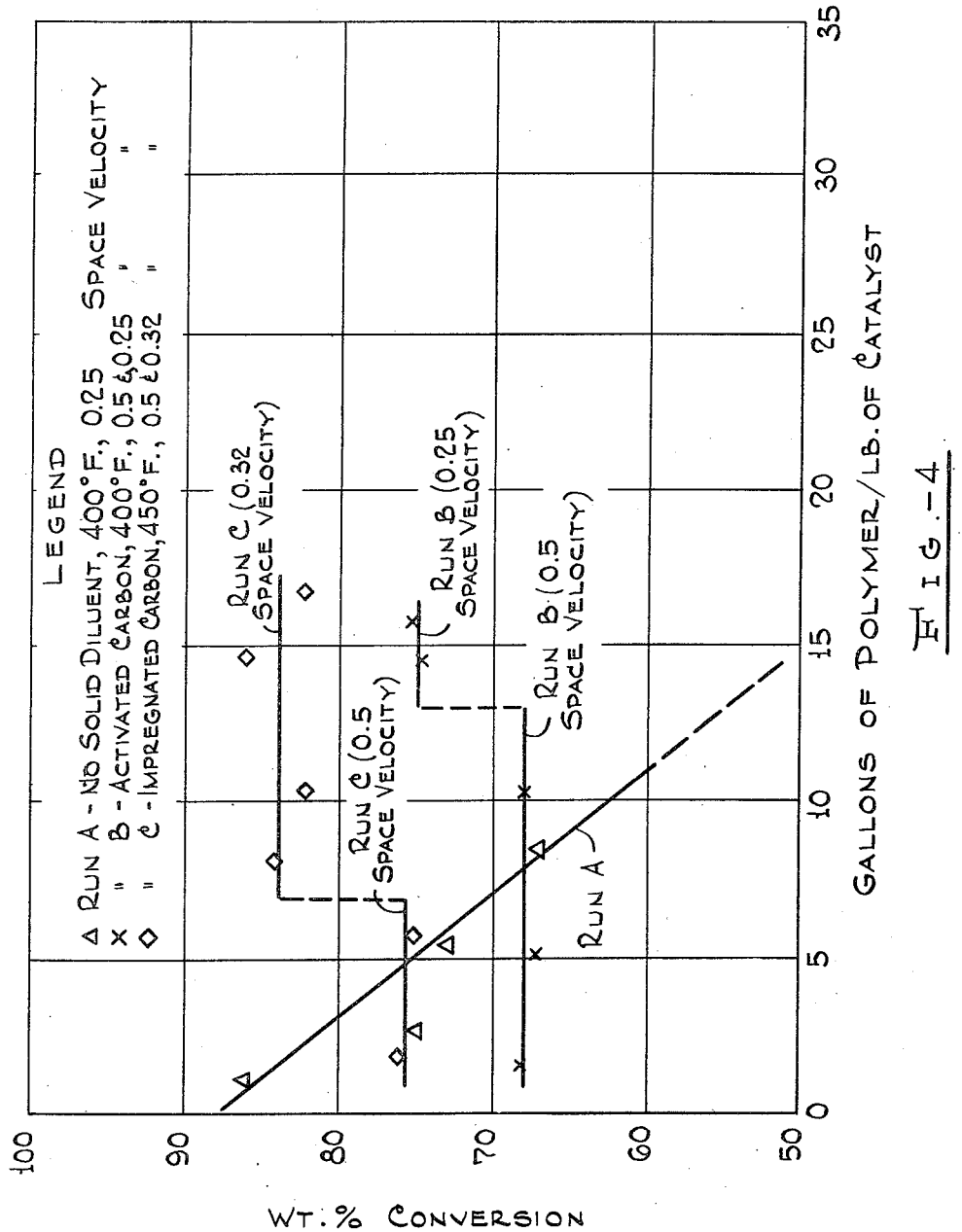

United States Patent Office 2,697,733
Patented Dec. 21, 1954

2,697,733
POLYMERIZATION PROCESS

Sumner B. Sweetser, Cranford, and Donald D. MacLaren, Scotch Plains Township, Union County, N. J., assignors to Standard Oil Development Company, a corporation of Delaware Application May 18, 1951, Serial No. 226,966

6 Claims. (Cl. 260—683.15)

The present invention is concerned with producing low boiling polymers suitable for use in fuels by the polymerization of olefins in the presence of a suspended, agitated catalyst in which a solid diluent is maintained in co-suspension with the catalyst to avoid agglomeration thereof. More particularly the present invention is concerned with an improved finely divided, solid diluent for use in the above type polymerization process, the diluent comprising an adsorbent carbon which not only substantially eliminates catalyst agglomeration but also extends the active life of the catalyst.

It is well known in the art to treat olefins and olefin-containing streams with various catalyst as, for example, phosphoric acid in order to polymerize the olefins to higher boiling hydrocarbon constituents. In general, the feed streams comprise normally gaseous olefins such as ethylene, propylene, butylenes, pentylenes and mixtures thereof, which are polymerized to hydrocarbon constituents which boil in the range below about 420° F. Although up to 100% olefinic streams may be utilized as feed stocks, it is generally preferred to have paraffinic diluents present in the range of from about 40% to 90% by weight in order to reduce the formation of carbonaceous deposits on the catalyst and to provide better temperature control in the catalyst bed. A particularly advantageous method of carrying out the polymerization operation is that of suspending a finely divided catalyst comprising phosphoric acid supported on a solid, adsorbent carrier in a fluid comprising the olefin feed stock. The catalyst is agitated during the contacting operation in order to obtain uniform contact of the olefins and catalyst and to achieve uniformity of temperatures throughout the reaction zone. This type of operation is an improvement over the conventional "fixed bed" polymerization process because of the difficulty of obtaining uniform temperatures in the highly exothermic reaction when it is conducted in the latter type of operation.

A disadvantage of the suspension-type polymerization is that solid phosphoric acid catalysts tend to agglomerate even after short operating periods with the result that the particles cannot be maintained in a fluidized or suspended condition. Various finely divided adsorbents have been used effectively as diluents for the purpose of preventing or minimizing agglomeration of catalyst particles. However, with some solid diluents a considerable loss in activity in the catalyst has resulted from the transfer of phosphoric acid from the catalyst to the diluent. Some diluents also have a tendency to soften under polymerization conditions and do not have high structural strength desired for this purpose.

It is, therefore, a primary object of the present invention to provide a diluent that may be used in co-suspension with a supported phosphoric acid catalyst to reduce effectively catalyst agglomeration, to have a high resistance to softening under polymerization conditions, to be substantially inert to phosphoric acid supported on the catalyst, and to extend greatly the life of the catalyst under polymerization conditions.

A finely divided diluent comprising adsorbent carbon meets many of the requirements mentioned above. Adsorbent carbon impregnated with phosphoric acid, although having a lower polymerization activity than phosphoric acid supported on a non-carbonaceous base such as a siliceous earth has an additional advantage over adsorbent carbon per se in minimizing transfer of phosphoric acid from the active catalyst to the adsorbent diluent, in extending the life of the catalyst and in contributing to the overall conversion of olefins because of its catalytic activity.

Figure 2:
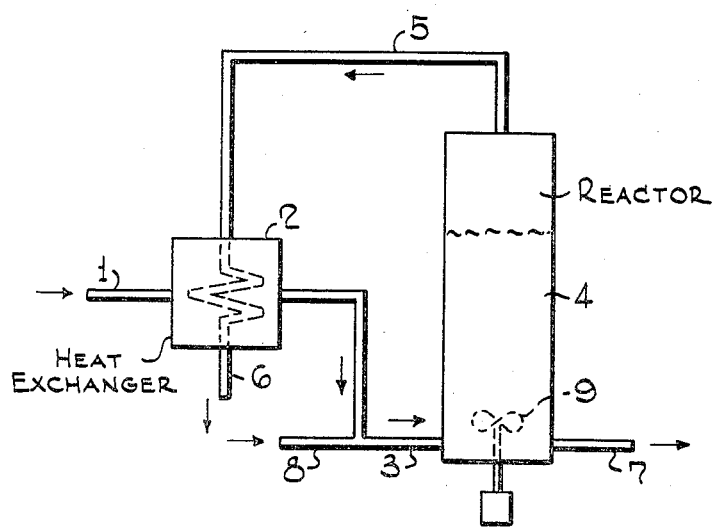
Figure 3:
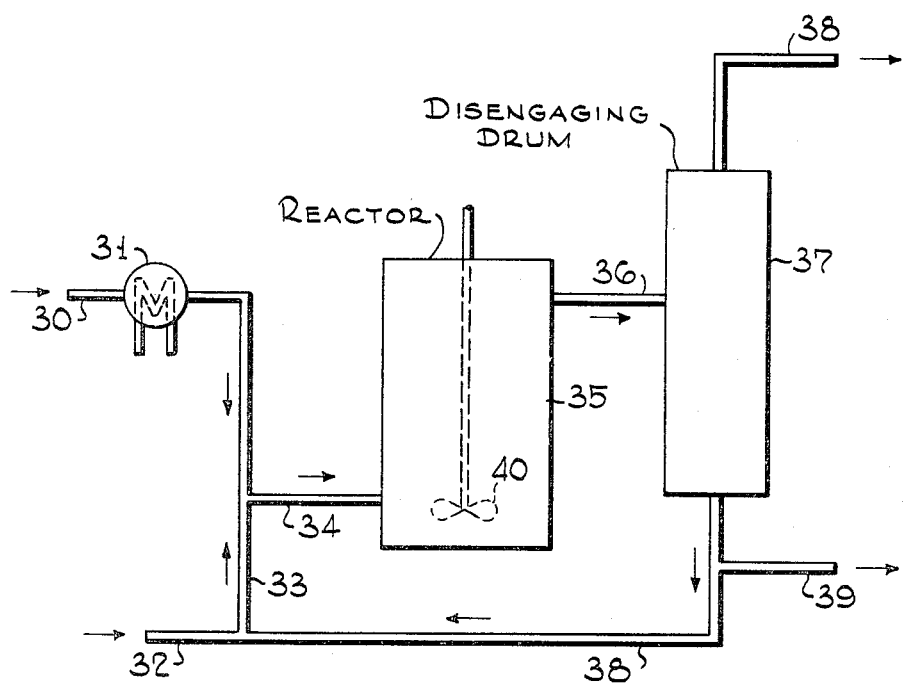

The manner in which the present process is carried out will be fully understood from the following description when read with reference to the accompanying drawings wherein: Figure 1 is a diagrammatic flow drawing illustrating one embodiment of this invention in which the catalyst and diluent are maintained in agitated co-suspension by means of feed flowing upwardly therethrough; Figure 2 represents another embodiment of the invention in which the catalyst and solid diluent are maintained in co-suspension by means of mechanical agitation; Figure 3 represents an embodiment of the invention in which the catalyst and solid diluent are maintained in co-suspension as a slurry in a heavy oil in contact with the olefin, and the slurry is recycled to the reaction zone; and Figure 4 presents a family of curves showing a catalyst life obtainable when using various solid diluents.

Referring to Figure 1, a normally gaseous $C_3$, $C_4$ hydrocarbon fraction containing 50% paraffins and 50% olefins, the latter consisting of 50% propylene and 50% butylene, is introduced at 100° F. and about 1000 lbs./sq. in. gauge by line 1 to heat exchanger 2 where it is heated to 250 °F. The heated feed is then introduced by line 3 into the bottom of reaction zone 4 maintained under 100 lbs./sq. in. gauge pressure and at a temperature of 450° F. The reaction zone contains a finely divided catalyst consisting of phosphoric acid deposited on kieselguhr of about 140–200 mesh, and about 10 to 50 weight percent based on the catalyst of about 140–200 mesh activated carbon. The feed is introduced upwardly through this catalyst at about 1 to 2 feet per minute so that the catalyst and diluent particles are maintained in agitated co-suspension in the feed. Thus the more dense catalyst particles will lag behind the less dense olefins and the catalyst will concentrate in the lower portion of the reaction zone in a dense phase mass which acts as if it had a level similar to a boiling liquid. The diluent particles which have settling characteristics similar to the catalyst will act in a similar manner.

There is very little catalyst if any above the pseudo level within the reactor and little or no catalyst entrainment occurs.

The carbon particles interdispersed with the catalyst presumably act to adsorb solid or high boiling polymers formed initially, although this invention is not intended to be limited by any theory as to the action of the solid diluent.

The products from zone 4, boiling for the most part in the motor fuel boiling range, are removed, substantially free from catalyst, by line 5 and passed through heat exchanger 2 where they give up heat to incoming feed. The cooled products are then passed by line 6 to any desired fractionating or stabilizing means, not shown.

From time to time catalyst and solid diluent are removed from reaction zone 4 through line 7 and burned or otherwise disposed of. Makeup catalyst is added by line 8. The process is therefore non-regenerative.

In order to maintain a more positive agitation of the fluidized catalyst in the reaction zone 4, and to permit greater flexibility in feed rates, a mechanical stirring device may be used, as for example, agitator 9 shown in Figure 2. The operation of the apparatus in Figure 2 is otherwise the same as in Figure 1.

A somewhat different embodiment of the invention is shown in Figure 3. According to this embodiment the propylene-butylene-paraffin mixture is passed through line 30 to preheater 31 where it is heated to a reaction temperature and compressed to a desired reaction pressure. The preheated and compressed feed is slurried with finely divided phosphoric acid catalyst on kieselguhr mixed with 10–50% by weight of finely divided adsorbent comprising carbon flowing through lines 32 and 33. The catalyst and carbon are preferably slurried with a hydrocarbon oil having an initial boiling point above the final boiling point of the polymer. An oil boiling in the range of about 450°–650° F. is suitable. The mixture of olefins, catalyst, and carbon are then passed by line 34 to reaction zone 35 including stirring means 40 where they are maintained in contact for a sufficient length of time to convert the feed into the desired motor fuel product. The mixture of unreacted olefins, catalyst, carbon and product are passed by line 36 to disengaging drum 37 where the pressure is reduced. As a result of the reduction in pressure, the products are vaporized and pass overhead through line 38 for further treatment as desired. Catalyst and carbon particles slurried in the high boiling hydrocarbon oil are removed from disengaging drum 37 by line 38 and recycled to the reactor through lines 33 and 34. From time to time a small amount of slurry may be removed from the system through line 39. Fresh catalyst and adsorbent carbon are added to the system through line 32. This modification offers a convenient means for removing spent catalyst from the system, for adding fresh catalyst, and for separating polymer and unreacted feed from the catalyst.

Reaction zone 35 may be a coil or it may be an enlarged chamber or drum.

In order to illustrate further the invention, the following examples are given:

EXAMPLE 1

A series of runs was conducted in which a feed stream comprising about 50 weight percent of propylene and 50 weight percent propane was passed through Ascarite (comprising sodium hydroxide on asbestos) and silica gel chambers connected in series in order to remove contaminating materials such as nitrogenous compounds. The feed was then passed through a water saturator at about 100–110° F. to supply water needed to maintain the catalyst at a proper degree of hydration. The feed containing a small amount of water was then charged continuously to an electrically heated reactor which included a multi-blade agitator operated at 300 R. P. M. to maintain the catalyst and solid diluent in agitated co-suspension. The reaction zone was operated at about 1000 p. s. i. g. and temperatures in the range of 400–450° F. Catalysts having identical compositions were used in all runs.

In run A, the reactor contained only a 40–60 mesh catalyst comprising about 80% phosphoric acid deposited on kieselguhr. In run B the reactor contained, in addition to the catalyst, 20 weight percent based on the catalyst of 20–50 mesh activated carbon (having a surface area of from 750–850 square meters/gram) as a solid diluent. In run C, 20 weight percent based on the catalyst of a solid diluent, comprising 20–50 mesh activated carbon (having about the same surface area as that used in run B) having 20 weight percent phosphoric acid impregnated thereon, was used. The impregnated carbon was prepared as follows:

For each 100 pounds of activated carbon, a solution was prepared by diluting 2.1 gallons of 85% phosphoric acid with water to 18.1 gallons, the carbon and solution were mixed, a small amount of residual solution was drained off, and the solid was dried, and heated at 450° F. for 2 hours.

In the various runs, olefin-containing feed was introduced near the bottom of the reactor, and polymer and unreacted feed were continuously withdrawn near the top of the reactor. Space velocities were varied in the range of from 0.25 to 0.5 gallon of feed per hour per pound of true catalyst (excluding solid diluent). Feed conversions to polymer were determined at various intervals during the run. The results of these runs are shown in Figure 4 in which weight percent conversion of propylene is plotted versus gallons of polymer produced per pound of true catalyst used. When using no diluent, conversions were high initially but gradually declined with increasing polymer production. Unexpectedly, conversions were constant at constant space velocities with increasing polymer production when carbon or impregnated carbon were used.

Data taken from the various runs and interpolated and extrapolated from the curves in Figure 4 are summarized in Table I below and show olefin conversions obtained at production levels of 10 gallons of polymer per pound of true catalyst when employing no solid diluent and when employing a solid diluent:

*Table I*

| Temperature, °F | | 400 | | | 450 | |
|---|---|---|---|---|---|---|
| Space Velocity: Gal. Feed/Hr./Lb. of catalyst Based on Total Charge | 0.5 | 0.32 | 0.25 | 0.5 | 0.32 | 0.25 |

| Run No. | Solid Diluent | Wt. Percent Conversion at 10 gal. poly/lb. Cat. | | | | | |
|---|---|---|---|---|---|---|---|
| A | None | 56 | 60 | 62 | 64 | 68 | 70 |
| B | Activated Carbon | 68 | 72 | 74 | 76 | 78 | 82 |
| C | Carbon Impregnated with $H_3PO_4$ | 68 | 76 | 79 | 76 | 84 | 87 |

It was found that catalyst agglomeration was serious in run A, the catalyst being badly caked on the reactor walls when no diluent was employed. Substantially no agglomeration occurred in the other runs using a solid diluent. It will be noted that both activated carbon and impregnated activated carbon permitted high conversions to be maintained at all space velocities. In addition, the impregnated carbon was found to be superior to the activated carbon per se.

The advantage of longer catalyst life is more clearly demonstrated in the data in Table II below in which conversions at a fixed space velocity are shown at various polymer production levels. The data were interpolated and extrapolated from the curves in Figure 4 to give data at the same space velocity. In addition the data were corrected to a constant temperature (450° F.) and thus may deviate slightly from correct values. However they do show relative conversion levels when using various diluents.

*Table II*

| Gals. Polymer/Lb. Catalyst | 5 | 10 | 15 |
|---|---|---|---|
| Run No. | Diluent | Wt. Percent Conversions at 0.3 gal./hr./lb., 450° F. Reaction Temp. | | |
| A | None | 80 | 68 | 45 |
| B | Carbon | 78 | 78 | 78 |
| C | Impregnated Carbon | 84 | 84 | 84 |

With no catalyst diluent, an initially high activity was obtained, but conversions and consequently catalyst life dropped off as the run was extended. A constant catalyst activity was maintained up to 15 gallons per lb. of catalyst when employing the activated carbon or impregnated activated carbon diluent. The advantage of impregnated carbon over carbon per se is also clearly shown.

The catalyst to be employed in the practice of the present invention is predominantly phosphoric acid supported on a non-carbonaceous, solid support, the support preferably being a siliceous base material such as diatomaceous earth, kieselguhr, silica gel, and aluminum silicates such as bentonite and montomorillonite and the like and mixtures of these. The phosphoric acid is usually present in amounts between about 50 and 90% total weight, the free phosphoric acid content being somewhat lower. The catalyst may be promoted with various materials such as from 1 to 5% of nickel or copper phosphate or other salts of copper, nickel, manganese, cobalt, iron, cadmium and the like. One suitable composition consists of 80% phosphoric acid supported on 20% kieselguhr, the catalyst being activated at a temperature between 600 and 900° F. The catalyst is in finely divided form, usually in the range of from 20 to 200 mesh, although mesh sizes in the range of from 20 to 50 will generally be preferred.

The adsorbent carbon employed as a diluent may be derived from a variety of sources. Activated carbons of relatively high surface area are useful in the present process. The adsorbent carbons are preferably those derived from coal or petroleum for reasons of cost. Activated carbons prepared by charring woods and other organic materials may be used. The carbon preferably should have a density fairly close to that of the finely divided catalyst. If the density of the carbon is too low, it will tend to be entrained from the reactor along with the product necessitating rather high carbon replacement rates. The carbon particles should also have a fairly high structural strength.

It is preferred to employ adsorbent carbon impregnated with phosphoric acid; the amounts of acid may range from very small quantities up to as high as 60% acid by weight based on the carbon. As a general rule it is preferred to use carbon containing from 10 to 45% of phosphoric acid. Carbon of the desired particle size may be treated with a 5 to 50% solution of a phosphoric acid, dried at a temperature of about 250° F. and then heated at from 400° to 500° F. temperature for 1 to 5 hours. A convenient procedure is that of adding just enough solution to be substantially completely adsorbed by the carbon, the solution containing an amount of phosphoric acid that will give the desired acid concentration on the carbon. Its polymerization activity will, of course, be somewhat lower than that of phosphoric acid deposited on a siliceous support. For example, a catalyst comprising as high as 70 to 80% phosphoric acid on adsorbent carbon will generally have an activity of only about 80 to 90% of that obtained with a silica or kieselguhr base catalyst of the same phosphoric acid content under the same polymerization conditions. However, the activity of the impregnated carbon diluent is sufficiently high to contribute to the overall conversion and, therefore, decrease the space velocity required in the reaction zone for a given conversion, as compared with the non-impregnated catalyst.

The diluent comprising the adsorbent carbon is generally in the 20 to 200 mesh range, but preferably in the 20 to 50 mesh range. From 5 to 50 percent by weight of diluent based on the catalyst may be used, although from 15 to 35 weight percent is to be preferred.

The feed streams for the polymerization operation are preferably normally gaseous hydrocarbons containing olefins. Various fluid diluents may be present. A preferred feed stream comprises one which contains from about 30 to 50% olefins, although higher concentrations of olefins may be utilized. Propylene, butylenes, and their mixtures are preferred olefins.

Polymerization temperatures in the range of from about 300 to 650° F. may be used; however, a preferred range is from about 350–600° F. Polymerization pressures likewise may be varied widely as, for example, from about 500 to 1500 p. s. i. g. or higher, although pressures above about 1000 p. s. i. g. will generally be needed to obtain economical conversion levels and are preferred since such pressures are above the critical of the reactants and products and thus the coexistence of gases and liquid states are avoided. Under these conditions the mixture of olefins, finely divided catalyst and finely divided adsorbent carbon may be called either a slurry or a fluidized mass, the change from one phase to the other not being perceptable. At lower pressures, however, the feed stock and reactants may be in a highly dense vapor or liquid state and the catalyst and diluent in fluidized or slurried condition may be suspended therein.

Feed rates will vary depending upon other operating conditions. In general feed rates equivalent to from about 0.5 to 15 volumes of liquefied gas per volume of catalyst per hour will be used.

In order to maintain the activity of the catalyst at high levels for long operating periods, it may be necessary to inject continuously or at frequent intervals into the reactor containing the catalyst small amounts of water in order to prevent dehydration of the catalyst. This water may be added in one of several ways. It may, if desired, be pumped directly into the inlet of the catalyst bed or metered streams may be employed. Another alternative is to contact the liquefied feed with water maintained at a suitable temperature to saturate the feed with the desired quantity of water. If the latter method is employed, the water for feed saturation is held at a temperature of from about 90° F. to 180° F., depending on operating conditions. An amount of water equivalent to from 0.1 to 2 gallons of water per thousand gallons of feed is required.

What is claimed is:

1. The non-regenerative catalytic process for polymerizing olefins which comprises the steps of forming in a reaction zone an agitated cosuspension of finely divided catalyst comprising phosphoric acid deposited on a solid, non-carbonaceous carrier and a finely divided solid diluent comprising adsorbent carbon impregnated with phosphoric acid in fluid hydrocarbon, continuously contacting said suspension with olefin feed at polymerization temperature and pressure, and continuously withdrawing substantially solid-free effluent including polymerized olefins from said zone while maintaining said catalyst and diluent in said suspension within said zone, said diluent being used in an amount in the range of about 5 to 50% by weight, based on said catalyst, whereby substantial agglomeration of said catalyst is prevented.

2. A process in accordance with claim 1 in which said co-suspension is formed by passing said olefin upwardly through said catalyst and diluent.

3. A process in accordance with claim 1 in which said co-suspension is formed by mechanically agitating said olefin, catalyst and diluent.

4. The non-regenerative catalytic process for polymerizing normally gaseous olefins which comprises the steps of forming in a reaction zone an agitated cosuspension of a solid, finely divided catalyst comprising phosphoric acid deposited on a siliceous carrier and a finely divided solid diluent comprising phosphoric acid deposited on an adsorbent carbon in fluid hydrocarbon, continuously contacting said suspension with olefin feed at polymerization temperature and pressure, and continuously withdrawing substantially solid-free effluent including polymerized olefins from said zone while maintaining said catalyst and diluent in said suspension within said zone, said diluent containing in the range of about 10 to 60 weight percent phosphoric acid deposited thereon and said diluent being used in an amount in the range of about 5 to 50% by weight, based on said catalyst, whereby substantial agglomeration of the catalyst is prevented and whereby loss of activity of said catalyst is minimized.

5. A process in accordance with claim 4 in which said carbon has impregnated thereon phosphoric acid in the range of about 10 to 45 weight percent based on said carbon.

6. A process in accordance with claim 5 in which said temperature is in the range of 350° to 600° F. and said pressure is from 1000 to 1500 p. s. i. g.

References Cited in the file of this patent

UNITED STATES PATENTS

| Number | Name | Date |
|---|---|---|
| 2,293,353 | Moravec et al. | Aug. 18, 1942 |
| 2,353,119 | Workman | July 4, 1944 |
| 2,354,261 | Hemminger | July 25, 1944 |
| 2,393,909 | Johnson | Jan. 29, 1946 |
| 2,443,673 | Atwell | June 22, 1948 |
| 2,456,338 | Stadtherr | Dec. 14, 1948 |
| 2,498,607 | Layng | Feb. 21, 1950 |